United States Patent
Fabre et al.

(10) Patent No.: US 7,330,436 B2
(45) Date of Patent: Feb. 12, 2008

(54) METHOD OF SELECTING TRANSMISSION PATHS AND A COMMUNICATION NETWORK USING THE METHOD

(75) Inventors: Benoît Fabre, Toulouse (FR); Zoely Canela, Fresnes (FR); Claire-Sabine Randriamasy, Meudon (FR)

(73) Assignee: Alcatel, Paris (FR)

( * ) Notice: Subject to any disclaimer, the term of this patent is extended or adjusted under 35 U.S.C. 154(b) by 1018 days.

(21) Appl. No.: 10/200,217

(22) Filed: Jul. 23, 2002

(65) Prior Publication Data

US 2003/0021233 A1 Jan. 30, 2003

(30) Foreign Application Priority Data

Jul. 26, 2001 (FR) ................................. 01 10001

(51) Int. Cl.
*H04L 12/26* (2006.01)
*H04L 12/28* (2006.01)

(52) U.S. Cl. .................... 370/238.1; 370/252; 370/254

(58) Field of Classification Search ................ 370/237, 370/238, 238.1, 252, 254, 255, 351, 352, 370/356, 395.5, 395.32, 395.52, 401; 709/239, 709/240, 241, 242

See application file for complete search history.

(56) References Cited

U.S. PATENT DOCUMENTS

| | | | | |
|---|---|---|---|---|
| 5,537,394 A | * | 7/1996 | Abe et al. ................... | 370/252 |
| 6,067,572 A | * | 5/2000 | Jensen et al. ............... | 709/241 |
| 6,535,504 B1 | * | 3/2003 | Johnson et al. ............. | 370/351 |
| 6,563,798 B1 | * | 5/2003 | Cheng ........................ | 370/255 |
| 6,633,544 B1 | * | 10/2003 | Rexford et al. ............. | 370/238 |
| 6,859,842 B1 | * | 2/2005 | Nakamichi et al. ......... | 709/238 |
| 6,993,593 B2 | * | 1/2006 | Iwata .......................... | 709/238 |
| 2002/0141345 A1 | * | 10/2002 | Szviatovszki et al. ...... | 370/238 |
| 2002/0186665 A1 | * | 12/2002 | Chaffee et al. ............. | 370/255 |

OTHER PUBLICATIONS

Jacques Ganoulis, Ranking Alternative Strategies of Agricultural Water Use In the Euro-Mediterranean Area, Mar. 30, 2001, Institut de la Mediterranee, pp. 3, 5-6.*
A. Borella et al, Improving the Cost/Performance Ratio in Multicast Communications, Proceedings of the European Conference on Networks and Optical Communications 2000. noc2000. Broadband Access, WDM Metro and Network Management, IOS Press, vol. PRT 2 of 2 pp. 187-190 XP000993864.
C. Casetti et al, An Adaptive Routing Algorithm for Best-Effort Traffic in Integrated-Services Networks, Proceedings of the International Teletraffic Congress. ITC-16. Teletraffic Engineering in a Competitive World. Edinburg, UK, Jun. 7-11, 1999, Teletraffic Science and Engineering, vol. 3B, Jun. 7, 1999, pp. 1281-1290 XP000878159.

* cited by examiner

*Primary Examiner*—Kwang Bin Yao
*Assistant Examiner*—Warner Wong
(74) *Attorney, Agent, or Firm*—Sughrue Mion, PLLC

(57) ABSTRACT

The present invention provides a method of determining or selecting a path for transmitting data in packets in an Internet Protocol communication network and a communication network using the method. The method comprises predetermining a limited number of paths by repeatedly applying a single criterion selection method to all of the paths in the network concerned, using different first criteria, and then determining one or more given paths from said limited number of predetermined paths by comparing them with each other on the basis of two or more conditional criteria and then classifying them.

16 Claims, No Drawings

METHOD OF SELECTING TRANSMISSION PATHS AND A COMMUNICATION NETWORK USING THE METHOD

The present invention relates to transmitting data in the form of packets in a network, and in particular to optimizing routing for transmitting data in the form of packets in an Internet Protocol network, and the present invention provides a method of selecting a transmission path and a communication network using the method.

BACKGROUND OF THE INVENTION

At present, in the specified field of transmitting data in the form of packets in a network, a transmission path (also known as a transmission channel or route) is generally selected allowing for a single evaluation criterion, which is not necessarily the best one, as there will often be several criteria pertinent to the selection process, associated with different required properties or characteristics.

The above kind of selection process is not the optimum process in the particular situation where two or more contradictory criteria are pertinent to the choice of a transmission path but only one of them is used to make the selection.

The routing or transmission path selection protocol most frequently used is the Open Shortest Path First (OSPF) protocol, which uses a Dijkstra algorithm that is particularly suitable for Internet Protocol networks, or a derivative of that algorithm.

Those prior art algorithms can take only one evaluation criterion into account in each selection procedure, that criterion being cumulative in the sense that the weight representing the evaluation of each path analyzed corresponds to the sum of the individual weights of the arcs of the path concerned.

There is currently a requirement for routing in Internet Protocol networks based on simultaneous and sometimes contradictory routing or selection criteria, for example transmission time, distance, cost, stability and load balancing in the network used.

There are multiple criteria decision or selection methods, of course, and these could be used in multiple criteria selection operations for choosing an optimum transmission path, possibly representing a best compromise, in the light of different criteria.

However, processing all paths by such multiple criteria methods would require a very large number of complex processing operations, calling for commensurate computing power and leading to disproportionate delays and costs that would be unacceptable in the field to which the invention relates.

OBJECTS AND SUMMARY OF THE INVENTION

A particular object of the present invention is to overcome the drawbacks and limitations referred to above.

To this end, the present invention provides a method of determining or selecting a path for transmitting data in packets in an Internet Protocol communication network, which method comprises predetermining a limited number of paths by repeatedly applying a single criterion selection method to all of the paths in the network concerned, using different first criteria, and then determining one or more given paths from said limited number of predetermined paths by comparing them with each other on the basis of two or more conditional criteria and then classifying them.

The basic idea of the invention relies on employing two successive selection stages, namely a stage comprising a first series of selection operations based on criteria applied separately and individually, followed by a second stage comprising a selection operation including a step which applies conditional criteria simultaneously and uses the results of said first series of selection operations.

To minimize the total duration of the processing required, the preselection or predetermination step or stage advantageously applies a single criterion selection method simultaneously to various paths in processing procedures running in parallel, using different first criteria, each processing procedure proposing one or more paths that represents an optimum in the light of the respective first criterion.

However, the processing of the predetermination step can be effected in a consecutive or serial manner, by applying said single criterion selection method repeatedly to the various paths, allowing for the point of departure and the point of arrival, using a different evaluation criterion each time, especially if the total processing time is not critical and/or adequate computing power is available.

In a preferred embodiment of the invention, the single criterion selection method is implemented in software based on the Dijkstra algorithm or a variant thereof.

The first criteria can advantageously be chosen, for example, from the group comprising the shortest transmission distance, the second shortest transmission distance, the shortest transmission time, the second shortest transmission time, the lowest transmission cost, the second lowest transmission cost, the greatest available bandwidth, and the second greatest available bandwidth.

Of course, other evaluation criteria can be applied, for example availability, nature of transmission medium or media, or reliability and security of transmission, in relation to the paths offered by the network for the link that is envisaged.

Each of the conditional criteria previously mentioned preferably consists in a variable conditional on a test of the (first criterion k on path X>first criterion k on path Y) type and taking the value 1 if the test is satisfied, for example, and the value −1 otherwise.

According to an advantageous feature of the invention, the step of final determination of a given path consists of comparing the predetermined paths two by two on the basis of weighted conditional criteria which are combined with each other to form a classification criterion, then classifying said predetermined paths as a function of the results of said comparison operations, and finally selecting one or more paths as a function of their rank within said classification.

The classification criteria can relate in particular to transmission characteristics, parameters and/or specific technical features determined by the network operator as a function of the type or types of service required for the transmission that is envisaged or the call concerned, and possibly the quality of service to be provided, as a function of user requests or the nature of the call concerned.

The classification criteria could be, for example, some of said first criteria and/or simple conditional criteria, in the form of combinations each assigned a particular weight as a function of its importance in the transmission mode that is envisaged.

In a first variant of the invention, a multiple criteria algorithm is used to compare the predetermined paths and possibly for their subsequent classification.

The multiple criteria selection algorithm is advantageously based on the ELECTRE method, and preferably on the ELECTRE II method (Bernard Roy, LAMSADE, Paris IX Dauphine).

In a second embodiment of the invention, a multiple criteria selection algorithm based on individual linear comparison operations applied to the predetermined paths is used for the final determination, leading to two by two classifications, each individual comparison producing a classification criterion Wxy which is equivalent to the algebraic sum of weighted conditional criteria each corresponding to a variable conditional on a first criterion.

To obtain multiple transmission paths, for example one or more paths for each type of call or transmission concerned, the method according to the invention can carry out successive final determination operations based on different groups or different combinations of different weighted conditional criteria defining preferred paths or preferred groups of paths, each preferred path or preferred group of paths being allocated to one type of service and/or to a given quality of service.

The present invention also provides a method of transmitting data in packets in an Internet Protocol communication network, which method determines a transmission path by means of the method defined hereinabove before each call is set up or before each transmission sequence during a call in progress.

Finally, said invention also relates to an Internet Protocol communication network adapted to transmit data in packets, which network includes a processor using the method defined hereinabove to determine and configure transmission channels or paths in said network, in particular transmission channels or paths between the routing modules used.

Said processor preferably has an architecture authorizing simultaneous parallel processing.

DETAILED DESCRIPTION OF THE INVENTION

A practical embodiment of the present invention is described hereinafter in more detail, but not in any limiting way.

As previously indicated, the selection of an optimum transmission path or route, preferably the selection of a number p of optimum paths, is effected by first performing simultaneous primary selections by executing in parallel several single criterion routing or path selection algorithms having the same structure and processing exactly the same problem (selection of best paths between a first point or router A and a second point or router Z forming part of the communication network concerned or connected thereto), applying different evaluation or selection criteria.

After this primary selection stage, supplying n optimum paths in the light of the criteria used, the best paths are selected from these n paths in accordance with routing criteria associated with the quality of service and using a multiple criterion selection method (selection of p paths from said n paths).

The selection method according to the invention can, for example, take the form of a composite algorithm with two separate processing stages, as described below.

The algorithm comprises two main steps, the second step in turn comprising three sub-steps.

Its structure is as follows:
1. predetermination of a limited number n of paths,
2. final selection of a subset of $p \leq n$ optimum paths,
   2.1. comparison of paths two by two,
   2.2. classification of paths as a function of the comparison,
   2.3. selection of the first p paths within the classification.

In the first stage, simultaneous processing based on the Dijkstra algorithm or a variant thereof produces a limited set of n (for example n=5) paths which are a priori interesting (the shortest path, the second shortest path, the path with the shortest transmission time, the path with the second shortest transmission time, the least costly path).

This preliminary processing stage avoids the need to process an excessively large number of paths in the subsequent multiple criteria processing stage.

Said second processing stage then consists of selecting and classifying the best p paths from said n preselected paths using a combination of conditional criteria constituting classification criteria.

Three criteria can be chosen for this second stage, for example the transmission time, the minimum free bandwidth on the transmission channels, and the average free bandwidth on the transmission channels. Note that the criteria associated with the bandwidth cannot be cumulative, but their values can be fixed at the start of the algorithm.

The network operator defines a weight $W_{i,ToS}$ for each criterion i as a function of the type of service (ToS), for example electronic mail, videoconference, etc.

The n paths are then compared to each other on the basis of this combination of criteria, to determine which ones outclass the others.

For example, the path X outclasses the path Y if $W_{xy}>0$ (or $W_{xy}>$any positive threshold S) with: $W_{xy}=$w1×(1 if (transmission time on path X<transmission time on path Y) or otherwise −1)+w2×(1 if (minimum free bandwidth on path X>minimum free bandwidth on path Y) or otherwise −1)+ w3×(1 if (average free bandwidth on path X>average free bandwidth on path Y) or otherwise −1).

In this example, w2 and w3 weight the network load balancing criterion.

Note that the ELECTRE method provides another outclassing comparison formula.

The n paths are then classified as a function of the comparison carried out in the preceding step. The ELECTRE method can be used for this classification, for example.

Accordingly, the path X and the path W are better than the path Y, for example, which is better than the path V and the path U.

It must be noted that the resulting order of the classification previously referred to may not be a total order, as some paths may have the same classification.

To arrive at a total order, if necessary, it is possible to apply one or more supplementary criteria over and above the criteria already used, or to choose a preferred criterion from the combination of criteria used, the preferred criterion then constituting the final discrimination criterion (for example, shortest path, lowest protocol address, etc.).

The last step of the selection process consists of finally choosing the p best paths obtained for each type of service and programming them into the transmission table.

Note that the method according to the invention allows the network operator to adapt or modify the selection method previously cited by amending and/or setting parameters of the corresponding algorithm using appropriate tools.

Thus the operator can in particular define freely the number n of paths resulting from the preselection process, the first criteria used by the Dijkstra algorithm in each parallel processing branch, the conditional and classification criteria used in the multiple criteria selection stage for each type of service, the number and weight of said conditional and classification criteria, the threshold s in the formula used in the classification method, the number p of paths retained as best paths for each type of service, and the type of service to be taken into consideration.

Furthermore, the person skilled in the art will also note that the determination or selection method described above can be interfaced totally with the routing methods and protocols in use at present, in particular the OSPF protocol.

Note further that, to compensate for the execution time of the algorithm, the algorithm can be executed in "masked time", i.e. as a background task, on a dedicated processor, and interfaced with a real-time Optimized MultiPath (OMP) loadsharing algorithm. The execution time would then be less of a problem in that the OMP (or other) algorithm would distribute the traffic over the p paths in a shorter computation time. For example, if the computation time of the algorithm according to the invention is one minute and the OMP algorithm computation time is five seconds, the OMP algorithm would be executed twelve times, considering the p(t) good paths at time t, and then a further twelve times for the p(t+1) good paths at time t+1 minute, etc.

Of course, the invention is not limited to the embodiment described, which can be modified without departing from the scope of protection of the invention, in particular by modifying the composition of the various components or by substituting technical equivalents.

The invention claimed is:

1. A method of determining or selecting a path for transmitting data in packets between a first point and a second point in an Internet Protocol communication network, which method comprises:
    predetermining a limited number of paths between the first and second points by repeatedly applying a single first criterion selection method to all of the paths in the network; and
    determining one or more paths between the first and second points from said limited number of predetermined paths, by comparing said limited number of predetermined paths between the first and second points with each other on the basis of two or more conditional second criteria and classifying the predetermined paths between the first and second points,
    wherein the predetermining the limited number of paths between the first and second points comprises repeatedly applying the single first criterion selection method using different first criteria and wherein the first criteria are chosen from the group comprising the shortest transmission distance, the second shortest transmission distance, the shortest transmission time, the second shortest transmission time, the lowest transmission cost, the second lowest transmission cost, the greatest bandwidth and the second greatest bandwidth, and
    wherein a multiple criteria selection algorithm based on the ELECTRE method is used to compare the predetermined paths with each other.

2. A method according to claim 1, wherein the predetermining and the determining is executed as a background task on a dedicated processor and interfaced with a real time load sharing algorithm.

3. A method of determining or selecting a path for transmitting data in packets between a first point and a second point in an Internet Protocol communication network, which method comprises:
    predetermining a limited number of paths between the first and second points by repeatedly applying a single first criterion selection method to all of the paths in the network; and
    determining one or more paths between the first and second points from said limited number of predetermined paths by comparing said limited number of predetermined paths between the first and second points with each other on the basis of two or more conditional second criteria and classification in the predetermined paths between the first and second points
    wherein a multiple criteria selection algorithm based on the ELECTRE method is used to corn are the predetermined paths with each other.

4. A method according to claim 3, further comprising a multiple criteria algorithm which classifies the determined paths.

5. A method of determining or selecting a path for transmitting data in packets between a first point and a second point in an Internet Protocol communication network which method comprises:
    predetermining a limited number of paths between the first and second points by repeatedly a limited number of paths between the first criterion selection method to all of the paths in the network; and
    determining one or more paths between the first and second points from said limited number of predetermined paths, by comparing said limited number of predetermined paths between the first and second points with each other on the basis of two or more conditional second criteria and classifying the predetermined paths between the first and second points,
    wherein the determining one of more paths between the first and second points comprises comparing the predetermined paths two by two based on combined weighted conditional criteria forming a classification criterion establishing a classification of said predetermined paths as a function of a result of said comparison operations, and selecting one or more paths as a function of rank in said classification, and
    wherein a multiple criteria selection algorithm is used for the determining one or more paths based on linear individual comparisons of the predetermined paths between the first and second points, leading to two by two classifications, each individual comparison producing a classification criterion equivalent to the algebraic sum of weighted conditional criteria each corresponding to a variable conditional on a first criterion.

6. A method according to claim 5, further comprising performing successive determination operations based on different groups of different weighted conditional criteria defining preferred paths, wherein each preferred path is allocated to at least one of a type of service and a quality of service.

7. A method according to claim 5, wherein the classification criteria comprise at least one of transmission characteristics, parameters and specific technical features, and are determined by a network operator as a function of types of services required for transmission.

8. A method according to claim 7, wherein the classification criteria are determined by the network operator as a function of quality of service to be provided.

9. A method according to claim 5, including successive determination operations based on different combinations of different weighted conditional criteria defining preferred groups of paths, wherein each preferred group of paths is allocated to at least one of a type of service and a quality of service.

10. A method of determining or selecting a path for transmitting data in packets between a first point and a second point in an Internet Protocol communication network, which method comprises:

repeatedly applying a single first criterion selection method using different first criteria to predetermine a limited number of paths between the first and second points, wherein the first criteria are chosen from a group comprising a shortest transmission distance, a second shortest transmission distance, a shortest transmission time, a second shortest transmission time, a lowest transmission cost, a second lowest transmission cost, a greatest bandwidth and a second greatest bandwidth, and wherein a multiple criteria selection algorithm based on the ELECTRE method is used to compare the predetermined paths with each other.

11. A method of transmitting data in packets in an Internet Protocol communication network, which method determines a transmission path using the method according to claim 10 before each call is set up or before each transmission sequence.

12. An Internet Protocol communication network for transmitting data in packets, which network includes a processor executing the method according to claim 10 to determine and configure transmission channels or paths in said network, in particular transmission channels or paths between the routing modules used.

13. A network according to claim 12, wherein said processor has an architecture allowing simultaneous parallel processing.

14. A method according to claim 10, wherein the predetermining the limited number of paths between the first and second points comprises using different first criteria and each processing procedure proposes one or more optimum paths between the first and second points in the light of the respective first criterion concerned.

15. A method according to claim 10, wherein the single first criterion selection method is implemented in software based on the Dijkstra algorithm or a variant thereof.

16. A method of determining or selecting a path for transmitting data in packets between a first point and a second point in an Internet Protocol communication network, which method comprises:

predetermining a limited number of paths between the first and second points by repeatedly applying a single first criterion selection method to all of the paths in the network; and determining one or more paths between the first and second points from said limited number of predetermined paths, by comparing said limited number of predetermined paths between the first and second points with each other on the basis of two or more conditional second criteria and classifying the predetermined paths between the first and second points, wherein a multiple criteria selection algorithm based on an ELECTRE II method is used to compare the predetermined paths with each other.

* * * * *